Patented Mar. 15, 1938

2,111,517

UNITED STATES PATENT OFFICE 2,111,517

CEMENT MANUFACTURE

Mikael Vogel-Jorgensen, Frederiksberg, near Copenhagen, Denmark, assignor to F. L. Smidth & Company, New York, N. Y., a corporation of New Jersey No Drawing. Application September 3, 1936, Serial No. 99,244. In Great Britain September 5, 1935

9 Claims. (Cl. 106—25)

This invention relates to the manufacture of cement by the wet process, and is concerned more particularly with a novel method of producing slurry for use in cement manufacture.

Slurry prepared by the new method may be agitated and otherwise handled more easily than slurry as ordinarily produced, and in addition, the fine particles do not settle so quickly. Also, the specific gravity of the new slurry is so reduced that small stones and other similar undesirable foreign bodies settle more rapidly than in ordinary slurry and may, therefore, be more easily removed.

In the wet process for the manufacture of cement as now practised, the raw materials are mixed with a substantial quantity of water, and the slurry made homogeneous. The agitation referred to is usually effected by mechanical means, but, if desired, such mechanical agitation may be supplemented or replaced by air agitation.

The present invention is directed to a novel method of preparing slurry which is to be treated as above described, and, in accordance with the invention, the slurry is converted into foam with the result that the agitation and mixing thereof are greatly facilitated, the time consumed in these operations is shortened, and the power cost is reduced.

In the practice of the invention, this conversion of the slurry into foam may proceed simultaneously with the mixing thereof and may be effected by adding foam-generating substances to the raw materials following which air is forced into or through the mixture. If desired, however, a foam previously prepared may be added to the mixture.

Various substances may be used for the generation of the foam, as for example, soaps, gelatine, or soaps with an addition of gelatine or similar material. Resin soap (either soda or potash) with an addition of glue is particularly efficient. The amount of the substance used is relatively small and in general is in the order of 0.05% to 0.2% by weight of the slurry.

Instead of adding foam-generating substances to the raw materials and then agitating the mixture to produce foam, the conversion of the mixture into foam may be effected in other ways as, for example, by the use of chemical substances which, on introduction into the slurry, evolve gas by reaction. For this purpose, aluminum powder or calcium carbide may be employed, and when calcium carbide is used, it may be employed in the form of powder and may be impregnated with resin, oils, tars, silicates with low melting points, or the like, in order that the speed of gas evolution may be reduced.

In connection with the practice of the process, it may also be advantageous to render the slurry more fluid, and this can be accomplished by the addition of an electrolyte, such as sodium hydroxide or potassium hydroxide or a salt of an alkali and a weak acid, such for example, as sodium carbonate, potassium carbonate, or sodium silicate. When such an electrolyte is added to the slurry, the fluidity of the latter is increased even when the water content is reduced, and such slurry may be more readily converted into foam or mixed with previously prepared foam.

The conversion of slurry into foam, according to the invention, facilitates the agitation of the slurry and the particles therein do not settle so rapidly as in normal slurry. The reduction in the surface tension allows the air introduced into the slurry to form bubbles which do not burst, or at least burst less quickly than in the case of normal slurry. The suspended particles then have to follow the thin films of the bubbles in settling so that a greater resistance to the settling is offered. Slurry prepared in accordance with the new method offers the further advantage that the reduction in the specific gravity of the slurry and in the amount of agitation required permits small stones and other undesirable foreign bodies to settle rapidly and they may thus be easily removed.

I claim:

1. A method of producing slurry for use in cement manufacture which comprises adding a foam-generating substance to a mixture of cement raw materials and water, and agitating the mixture until it is converted into foam.

2. A method of producing slurry for use in cement manufacture which comprises adding a foam-generating substance to a mixture of cement raw materials and water, and introducing air into the mixture to agitate it and convert it into foam.

3. A method of producing slurry for use in cement manufacture which comprises mixing cement raw materials and water to form a normal slurry, adding a foam generating substance to the slurry, adding to the slurry substances which react with evolution of gas, and converting the slurry into foam.

4. A method of producing slurry for use in cement manufacture which comprises mixing cement raw materials and water to form a normal slurry, adding to the slurry a foam generating substance, adding to the slurry a substance which reacts with evolution of gas and a substance which reduces the speed of gas evolution, and converting the slurry into foam.

5. A method of producing slurry for use in cement manufacture which comprises mixing cement raw materials, water, and a foam-generating substance in an amount varying from about 0.05% to about 0.2% by weight of the slurry, and agitating the mixture until it is converted into foam.

6. A method of producing slurry for use in cement manufacture which comprises mixing cement raw materials, water, an electrolyte, and a foam-generating substance, and agitating the mixture until it is converted into foam.

7. A method of producing slurry for use in cement manufacture which comprises mixing cement raw materials and water to produce a normal slurry, creating a foam of a foam generating substance, adding the foam to the mixture, and agitating the mixture until it is substantially in foamy condition throughout.

8. A method of producing slurry for use in cement manufacture which comprises mixing cement raw materials and water to produce a normal slurry, creating a foam of a foam-generating substance in water, adding the foam to the mixture, and agitating the mixture and introducing air into it until it is in foamy condition throughout.

9. A method of producing slurry for use in the manufacture of cement which comprises mixing cement raw materials with water to produce a normal slurry, adding a foam generating substance to the mixture, and agitating the mixture to produce a slurry which is foamy throughout.

MIKAEL VOGEL-JORGENSEN.